United States Patent Office 3,360,993
Patented Jan. 2, 1968

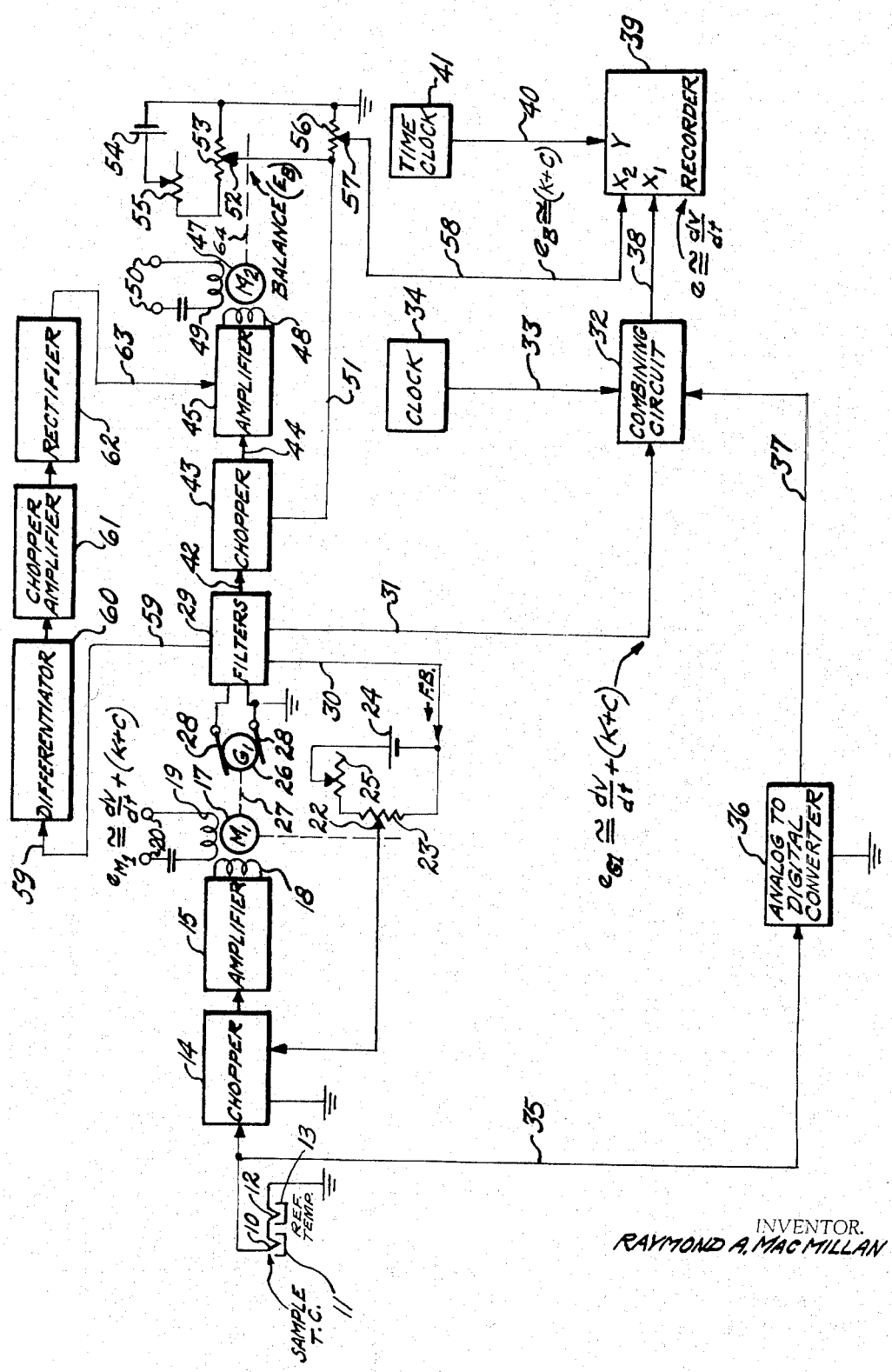

3,360,993
SINGLE THERMOCOUPLE DIFFERENTIATING
METHOD AND SYSTEM
Raymond A. MacMillan, Greenwood, Mass., assignor to
the United States of America as represented by the Secretary of the Air Force
Filed Aug. 27, 1965, Ser. No. 483,375
4 Claims. (Cl. 73—361)

ABSTRACT OF THE DISCLOSURE

A system having a thermocouple in a sample and a servomechanism-generator arrangement to differentiate the temperature signal produced by the thermocouple in order to clearly show points of thermal transition.

The invention described herein may be manufactured and used by or for the United States Government for governmental purposes without payment to me of any royalty thereon.

This invention relates to a method and system for measuring and recording thermal transitions in a material and more particularly to a method and system wherein the relation between a single thermocouple located in a sample and an ice-point-reference thermocouple is utilized to obtain an analog measurement of temperature.

Investigations of the thermal behavior of certain materials require the acquisition of data in the form of temperature-dependent properties versus time and/or temperature. When such data are obtained by conventional difference thermal analysis (DTA) techniques, indication and interpretation of minute temperature changes at specific times within the temperature transitions are limited by lack of detail inherent in the method. Conventional DTA techniques also give rise to difficulties in application to certain high-pressure apparatus.

Some of the problems encountered under high-pressure conditions are shearing of thermocouple wires, variations in the zero or base line due to unpredictable thermal behavior of the reference material, distortion and displacement of thermocouples within the sample and reference body, and loss of active volume of limited sample space by the reference sample.

To alleviate these problems and in accordance with the present invention the concept of change of temperature is measured and plotted versus time or temperature. This method employs a single junction located in the test sample and an external reference junction held at the ice point, no reference body or other reference being used.

The original dual or so-called differential thermocouple circuit was developed for the sole function of reducing to zero the millivoltage at any instant due to the constantly rising temperature of the environment, without reducing the signal of interest. To distinguish clearly between the original DTA technique, including circuit variations thereof, and the present method, this system is termed DATA, an acronym meaning differential analog thermal analysis. By application of servo and electronic techniques the analog measurement of the original function, temperature, is reproduced. Simultaneously the derivative with respect to time is generated and can be recorded as a function of time or other parameter. The physical advantages of the system, specifically as applied to high-pressure apparatus, are apparent. Other advantages rest in the extended evaluation of thermal behavior possible due to the increased detail of the recorded data coupled with accurate time and temperature points plotted simultaneously. This is appreciated in cases where the thermal response is extremely small such as in the alphabeta transition in quartz. This transition may be recorded in two different ways; i.e. (a) by the ordinary time-temperature method, and (b) by the differential analog method. The two methods were run simultaneously and identical temperature marks were imposed on both curves. Although the two curves had different time scales, the specific measured temperatures, $T_1$ and $T_2$ definitely located the thermal transition.

Note that in the case of (a) the signal produced by the thermal transition was too small to be observable with this method thermal transition was too small to be observable with this method of measurement but the same signal applied to the DATA system produced an unmistakable recording.

As an aid in understanding the recorded measurements of the two systems, consider a DTA plot for certain hypothetical conditions. The curve therefrom depicts the constantly rising temperature of the environment. The break in the curve identifies an event occurring within the sample such that heat is absorbed at exactly the same rate being supplied. Therefore, the temperature of the sample remains constant for an interval of time and then continues to rise at a different rate.

This event does not occur in the reference body, but the constantly rising temperature of the environment is measured by a junction in this body, connected in series opposition to the junction in the sample. The net output of the combination is ideally zero before the transition. During the transition, the junction in the sample ceases to change in temperature, i.e., remains constant. At this time, the algebraic summation yields a voltage difference in the order of millivolts, which results in a constantly increasing negative voltage having the same slope as the applied rate of change in the temperature environment.

This example is simplified for purposes of explanation, actual results being more complex, but in every case the transition recorded on the final plot contains information about the rate of heating, intermixed with information about the sample reaction under the conditions.

The same conditions applied to DATA where the derivative is plotted with respect to time to provide a curve. When change in rate is plotted, the instant of change is more readily located and defined as a beginning or end of a thermal event. Zero rate of temperature change is indicated when the voltage falls to zero. Other rates of change, during the transition, are proportional to the slopes of the curve for the respective points. This form of presentation facilitates interpretation and evaluation.

In accordance with the present invention the difference in EMF ($v$) between a single thermocouple located in a sample and an ice-point-reference thermocouple is differentiated with respect to time ($t$) by an analog servo system having an output proportional to $dv/dt$. The resulting proportionality constant, and the error produced by the slow variations in the system, are subtracted by means of a second servo system so that only $dv/dt$ is automatically recorded as a function of sample temperature.

An object of the present invention is to provide a method and system for automatically recording thermal transitions in sample materials.

Another object of the present invention is to provide a system for automatically recording thermal transitions in a sample material the relation of a single thermocouple in the sample material to an external reference thermocouple held at ice point is utilized to obtain an analog measurement of temperature which is then differentiated and plotted.

Yet another object of the present invention is to provide a system for automatically recording thermal transitions in a sample material wherever the difference in EMF ($v$) between a single thermocouple located in a sample and an ice-point-reference is differentiated with respect to time (*t*) by an analog servo system having an output proportional to $dv/dt$ with the resulting proportionality constant and the error produced by the slow variations in the system subtracted by a second servo system so that only $dv/dt$ is automatically recorded as a function of sample temperature.

The various features of novelty which characterize this invention are pointed out with particularity in the claims annexed to and forming part of this specification. For a better understanding of the invention, however, its advantages and specific objects obtained with its use, reference should be had to the accompanying drawing and descriptive matter in which is illustrated and described a preferred embodiment of the invention.

Now referring in detail to the single drawing of this invention, there is shown thermocouple junction 10 located in sample material 11 to which may be applied a controlled heat. Thermocouple junction 12 is located in temperature reference material 13 such as ice to thereby provide an ice-point-reference. Thermocouples 10 and 12 are connected in series opposition between the input of chopper 14 and ground to obtain a voltage difference which serves as the difference input signal to chopper 14. The output of chopper 14 is an alternating current signal whose magnitude is a function of the temperature difference between the sample material and the reference. The A.C. signal is passed through amplifier 15 and fed to servomotor 17 by way of input winding 18. Servomotor 17 also includes winding 19 which receives a standard 115 v. 60 cycle input by way of terminals 20. Shaft 21 of servomotor 17 is connected to movable arm 22 of potentiometer 23. Potentiometer 23, battery 24 and variable resistance 25 are connected in series and comprise a reference voltage source which is automatically maintained equal to the input voltage of chopper 14. This mode of operation is obtained by feeding into chopper 14 a D.C. reference voltage from movable arm 22 and also aforesaid difference input signal. The operation of chopper 14 is conventional. With the magnitude of the D.C. difference input signal and the magnitude of the D.C. reference signal equal, the output of chopper 14 is zero. However when there exists a difference between aforesaid two inputs to chopper 14, then there is an output therefrom which is applied to servomotor 17 by way of amplifier 15, to activate shaft 21 as to position movable arm 22 in the proper direction and magnitude to provide a reference signal therefrom equal to the magnitude of the difference input signal to chopper 14. Upon achieving the aforementioned equality, the output from chopper 14 becomes zero and servomotor 17 no longer rotates. The voltage on movable arm 22 is automatically maintained equal to the input voltage to chopper 14 and is, in fact an analog of the temperature in sample material 11.

The aforegoing is a detailed description of the first servosystem of the present invention. The servosystem is designed for relatively high-speed balance, for a 100-microvolt change applied to the input, balance is obtained in 0.5 sec., while the steepest slope requires 5 seconds to traverse, at 30 deg. C./m. The aforegoing relates to a sample material of quartz, with tin utilized as a sample material, there is even a slower rate of change for any part of the temperature transition. The ratio of servobalance speed to rate of change of input signal of approximately 1 to 10, allows the first servosystem to follow the relatively slower rates of temperature change within the sample, with negligible error. This follower action results in a servomotor speed which is proportional at any instant to the rate of change of input.

Direct current (D.C.) generator 26 is driven by servomotor 17 by way of shaft 27, therefore, the output voltage of generator 26 is the time derivative of the applied function.

To extend the linear range of servomotor 17 characteristic, some of generator 26 output voltage is fed through filter 29 and is applied as negative feedback in series with movable arm 22 of potentiometer 23. Temperature of sample material 11 increased at a constant rate results in a constant generator speed while the signal of interest, from the temperature transition, produces variations about the constant rate. Speed is converted to an electrical quantity which may be subsequently plotted versus time or other parameter. The original undifferentiated function can be obtained by use of suitable integrator circuit, if required.

A second self-balancing servosystem as hereinafter described in detail, removes the constant and corrects for slow changes in the recorder pen zero position. The derivative generating circuit is completed through a movable resistance arm of the second servosystem, thus providing a means of subtracting time constant and zero drift, leaving only the signal of interest to be plotted. Switching is also provided to arrest the action of the second servosystem during a transition.

In the detailed description of the aforesaid second servosystem, generator 26 is of the permanent magnet field type with a direct current (D.C.) output obtained by way of brushes 28. Generator 26 is connected to servomotor 17 by way of shaft 27. The D.C. output from generator 26 is directly proportional to the speed of rotation of shaft 27. The temperature of the sample material may be increased linearly by controlling the environmental heating thereof and the actual temperature of the sample material at any instant of time is represented by the output voltage of generator 26 at that instant.

The D.C. output from generator 26 is passed through filter 29. The output from filter 29 by way of line 30 provides negative feedback and is also utilized to provide stabilization, i.e., prevents hunting.

The output signal from generator 28 is fed to combining circuit 32 by way of filter 29 and line 31. The output signal is $$e \cong \frac{dv}{dt} + (K+C)$$

Combining circuit 32 also receives one minute pulses by way of line 33 which are generated by clock 34 to provide timing pulses for recordation. Still further, combining circuit 32 receives pulses by way of analog-digital-converter 36 and line 37. It is to be noted converter 36 is connected to chopper 14 input by line 35. Analog-digital-converter 36 is conventional and provides a pulse for each preselected increment of voltage input received by way of line 35. For example, for each quarter of a millivolt input a pulse would be provided at the output thereof to provide information as to temperature of the sample material. The output of combining circuit 32 is fed by way of line 38 to terminal $X_1$ of X, Y recorder 39. Thus recorder 39 receives at terminal $X_1$ (1) timing pulses, (2) pulses representative of temperature of the sample material, and (3) a signal proportional to the rate of change of temperature of the sample material which is represented as $$e = \frac{dv}{dt} + (K+C)$$

However, it is highly desirable to remove the $(K+C)$ factor where K is a constant and C is the error due to small non-linearities of the practical function applied.

The second servosystem is provided to remove the aforementioned $(K+C)$ factor. In the second servosystem, chopper 43 receives an input signal from generator 28 by way of filter 29 and line 51. Servomotor 47 receives a signal from chopper 43 by way of line 44, amplifier 45 and winding 46. There is also applied a conventional 110 volt 60 cycles signal to winding 48 by way of terminals 50. Shaft 64 physically connects movable arm 52 of potentiometer 53 with servomotor 47. The series arrangement of potentiometer 53, battery 54 and variable resistance 55 serves as a D.C. reference source. Movable arm 52 is connected electrically by way of line 55 to chopper 43. Chopper 43 is so arranged that with equal magnitude inputs thereto, there is a zero output therefrom and with a difference of magnitude in the two inputs an output signal is provided. The said output signal being passed through amplifier 45 and actuating shaft 48 of servomotor 47 so that movable arm 52 is positioned in the proper direction and magnitude to provide a reference signal to chopper 43 by way of line 51 which is equal to the input signal received by way of line 42, thus providing a zero output from chopper 47. The time required to reach a balance for the second servosystem is adjusted to be much greater than the first servosystem, thus reducing the loss of the signal of interest. The output from movable arm 52 is equal to some gain factor times a $(K+C)$ factor. To obtain the requisite $(K+C)$ factor to cancel out the aforementioned $(K+C)$ factor there is provided potentiometer 56 which has movable arm 57 adjusted to cancel out the aforementioned gain and thus leaving a signal equal to the $(K+C)$ factor which is fed to terminal $X_2$ by way of line 58. As shown in the drawing, recorder 39 provides two input terminals $X_1$ and $X_2$, normally the $X_2$ terminal would be grounded. However, in this instance, the $X_2$ terminal is established above ground by whatever voltage appears on potentiometer 56 which is returned to ground at one end thereof thus providing the proper algebraic addition for aforesaid cancellation. Thus the X signal plotted on X, Y recorder 39 is $$e \cong \frac{dv}{dt}$$

Time clock 41 feeds preselected timing pulses by way of line 40 to recorder 39 for application to the Y axis.

In order to prevent the signal of interest from being reduced, even a small amount by the action of the second servosystem cut-off means is provided by gating off amplifier 45 at some preselected rate of change. Conventional amplifier 45 is designed to be gated off by a preselected level of negative voltage received by way of line 63. The preselected level of negative voltage is made to be proportional to the aforementioned rate of change of generator 26.

The requisite negative gating voltage is obtained by feeding a signal from generator 26 to filter 29 and from line 59 to differentiator 60. Differentiator 60 is an R.C. network that detects a change in rate. The output of differentiator 60 is fed to chopper-amplifier 61 and the output therefrom is rectified to apply a negative gating voltage to amplifier 45. Chopper-amplifier 61 may be adjusted for any desired threshold level. It is noted that to facilitate evaluation of the plotted curve on recorder 39, voltage pulses are provided which are proportional to temperature and time. Two sets of such temperature marks are available, representing tenths and hundreds, of the full scale value for the voltage for the thermocouple selected. These marks are generated by an analog-to-digital converter directly measuring temperature difference between the sample hot junction and the ice point junction.

What I claim is:

1. A system for automatically recording thermal transitions in a sample material comprising means to obtain the difference in voltage between a single thermocouple located in said sample and an ice-point-reference thermocouple, said thermocouples being connected in series opposition, means to differentiate said difference voltage with respect to time by an analog servo system having an output proportional to the rate of change of temperature of said sample material, means to subtract said resulting proportionality constant and the error produced by slow variations in said system, and means to automatically record the results of said subtraction.

2. A system for automatically recording thermal transitions in a sample material comprising a first thermocouple junction located in said sample material, a second thermocouple junction located in an ice-point-reference, said first and second thermocouple junctions being located in series opposition to provide a difference signal representative of the temperature of said sample material, first chopper means receiving said difference signal and having the output thereof fed to a first servomotor by way of a first amplifier, said chopper receiving a pair of inputs and operating to provide no output with said pair of inputs equal in magnitude and an output whenever the magnitude of said pair of inputs differ, a first reference source including a first potentiometer with a movable arm being physically connected to a shaft of said first servomotor and electrically to said first chopper with the proper magnitude and direction to provide a first reference signal with the magnitude therefrom equal to said difference signal, a direct current generator being driven by said first servomotor, the output signal from said generator being related to the time rate of change of the temperature of said sample material, a filter receiving the output signal from said generator, combining means receiving said filtered output signal and a timing pulse, an $xy$ recorder having a pair of $x$ axis terminals and a single $y$ axis terminal, said recorder receiving the output signal from said combining means at the first of said $x$ terminals and simultaneously receiving a preselected timing pulse at said Y terminal, second chopper means receiving said filtered signal to be fed to a second servomotor by way of a second amplifier, said second chopper means receiving a pair of inputs and operating to provide no output with equal amplitude inputs and an output wherever said pair of inputs differ in amplitude, a second reference source having a movable arm physically connected to a shaft of said second servomotor and electrically to said second chopper means and operating in the proper magnitude and direction to provide a reference signal therefrom having a magnitude equal to said filtered signal, and potentiometer means receiving at one end said second reference signal and being grounded at the other end with the movable arm thereof connected to said second X terminal of said recorder to provide an algebraic addition of the signals to said pair of input terminals, said recorder operating to record signals related to the time rate of change of the temperature of said sample material.

3. A system for automatically recording thermal transitions as defined in claim 2 and further including means to selectively gate-off said second amplifier during said thermal transitions to prevent said output signal from said direct current generator from being altered during said thermal transitions, said gating means being connected in series between said filter and said second amplifier and, consisting of a differentiator with a preselected time constant, a chopper-amplifier with a preselected threshold level, and a rectifier, respectively.

4. A system for automatically recording thermal transitions as defined in claim 3 and further including an analog to digital converter, said converter receiving said difference signal and providing output pulses fed to said combining means, said output pulses being representative of the actual temperature at any instant of time of said sample material.

References Cited

UNITED STATES PATENTS 2,676,489   4/1954   Basham _____ 73—154 X

LOUIS R. PRINCE, *Primary Examiner.*

F. SHOON, *Assistant Examiner.*